US011637426B2

(12) United States Patent
Kumar et al.

(10) Patent No.: US 11,637,426 B2
(45) Date of Patent: Apr. 25, 2023

(54) POWER ELECTRONICS INTELLIGENCE AT THE NETWORK EDGE (PINE)

(71) Applicant: The Texas A&M University System, College Station, TX (US)

(72) Inventors: Panganamala R. Kumar, College Station, TX (US); Le Xie, College Station, TX (US); Prasad N. Enjeti, College Station, TX (US)

(73) Assignee: The Texas A&M University System, College Station, TX (US)

( * ) Notice: Subject to any disclaimer, the term of this patent is extended or adjusted under 35 U.S.C. 154(b) by 432 days.

(21) Appl. No.: 16/646,496

(22) PCT Filed: Sep. 28, 2018

(86) PCT No.: PCT/US2018/053398
§ 371 (c)(1),
(2) Date: Mar. 11, 2020

(87) PCT Pub. No.: WO2019/067881
PCT Pub. Date: Apr. 4, 2019

(65) Prior Publication Data
US 2020/0274364 A1 Aug. 27, 2020

Related U.S. Application Data

(60) Provisional application No. 62/565,825, filed on Sep. 29, 2017.

(51) Int. Cl.
*H02J 3/16* (2006.01)
*H02J 13/00* (2006.01)
(Continued)

(52) U.S. Cl.
CPC .............. *H02J 3/16* (2013.01); *G05B 15/02* (2013.01); *H02J 3/12* (2013.01); *H02J 3/32* (2013.01);
(Continued)

(58) Field of Classification Search
CPC .............. H02J 3/381; H02J 13/00002; H02J 13/00036; H02J 3/16; H02J 3/12;
(Continued)

(56) References Cited

U.S. PATENT DOCUMENTS

| 5,621,627 A | 4/1997 | Krawchuk et al. |
| 2010/0109328 A1 | 5/2010 | Li et al. |

(Continued)

OTHER PUBLICATIONS

International Search Report with Written Opinion for International application No. PCT/US2018/053398 filed Sep. 28, 2018, search dated Jan. 24, 2019, 21 pages.
(Continued)

*Primary Examiner* — Ziaul Karim
(74) *Attorney, Agent, or Firm* — Baker Botts L.L.P.

(57) ABSTRACT

A device includes an input converter, an output converter, and a controller. The input converter is electrically coupled to an electrical meter and an energy production array. The output converter is electrically coupled to the energy production array and a load. The controller is communicatively coupled to the input converter, the output converter, the energy production array, and the load. The input converter and the output converter are positioned between the electrical meter and the load.

6 Claims, 16 Drawing Sheets

(51) Int. Cl.
*G05B 15/02* (2006.01)
*H02J 3/38* (2006.01)
*H02M 5/458* (2006.01)
*H04B 3/54* (2006.01)
*H02J 3/32* (2006.01)
*H02J 3/12* (2006.01)

(52) U.S. Cl.
CPC ............ *H02J 3/38* (2013.01); *H02J 3/381* (2013.01); *H02J 13/00002* (2020.01); *H02J 13/00034* (2020.01); *H02J 13/00036* (2020.01); *H02M 5/4585* (2013.01); *H04B 3/54* (2013.01)

(58) Field of Classification Search
CPC .......... H02J 3/32; H02J 3/38; H02J 13/00034; G05B 15/02; H02M 5/4585; H02M 1/10; H02M 1/12; H02M 1/14; H04B 3/54; Y02E 40/30; Y02E 40/70; Y02E 60/00; Y02E 60/7815; Y02B 10/10; Y04S 10/12; Y04S 10/14; Y04S 10/18; Y04S 10/22; Y04S 10/30; Y04S 40/121
See application file for complete search history.

(56) References Cited

U.S. PATENT DOCUMENTS

| | | | |
|---|---|---|---|
| 2010/0208501 A1* | 8/2010 | Matan | H02J 3/50 700/297 |
| 2010/0308584 A1 | 12/2010 | Coates et al. | |
| 2011/0210614 A1 | 9/2011 | Min | |
| 2012/0281444 A1* | 11/2012 | Dent | H02J 3/38 363/131 |
| 2013/0123989 A1 | 5/2013 | Krolak et al. | |
| 2016/0197478 A1* | 7/2016 | Khaitan | G06F 1/263 700/295 |
| 2017/0149244 A1* | 5/2017 | Recio | H02J 3/16 |
| 2019/0074779 A1* | 3/2019 | Frampton | H02J 7/2434 |

OTHER PUBLICATIONS

Hung-Ming Chou et al . . . , "Power Electronics at the Network Edge (PINE)", IEEE Energy Conversion Congress and Exposition (ECCE), pp. 5214-5221, Retrieved on Jan. 8, 2019.

* cited by examiner

US 11,637,426 B2

POWER ELECTRONICS INTELLIGENCE AT THE NETWORK EDGE (PINE)

PRIORITY

This application is a U.S. National Stage Filing under 35 U.S.C. § 371 of International Patent Application Serial No. PCT/US2018/053398 filed Sep. 28, 2018, which claims the benefit, under 35 U.S.C. § 119(e), of U.S. Provisional Patent Application No. 62/565,825, filed Sep. 29, 2017, which is incorporated herein by reference.

TECHNICAL FIELD

This disclosure relates generally to power distribution and more particularly to providing power electronics intelligence at the network edge.

BACKGROUND

Traditional power distribution control typically involves a top-down, centralized approach that includes a central distribution center with many capacitors to regulate the voltage to end-users. Maintaining a perfect voltage to end-users (e.g., 110V AC to homes) using this traditional approach, however, becomes more challenging as end-users become more and more heterogeneous with respect to the types of loads they present. For example, some homes may install batteries and solar panels, some may utilize an electric vehicle, some may install wind turbines, and some may be traditional homes with no energy storage or generation capabilities at all. As a result, current utility companies are increasingly faced with difficult challenges to overcome in order to provide high quality power to end-users.

SUMMARY

According to embodiments of the present disclosure, disadvantages and problems associated with previous power distribution systems may be reduced or eliminated.

In some embodiments, a device includes an input converter, an output converter, and a controller. The input converter is electrically coupled to an electrical meter and an energy production array. The output converter is electrically coupled to the energy production array and a load. The controller is communicatively coupled to the input converter, the output converter, the energy production array, and the load. The input converter and the output converter are positioned between the electrical meter and the load.

In some embodiments, a method includes maintaining a tunable power factor at a power line electrically coupled to an energy production array and a load. The method further includes regulating harmonic components of power provided by the power line to the load. The method further includes reducing a power distribution loss in a distribution system. The method further includes communicating a reactive power command to the energy production array.

In some embodiments, a system includes a first pulse-width modulation (PWM) converter, a second PWM converter, and a control module. The first PWM converter is coupled to a meter and a DC-link. The first PWM converter is configured to convert an input AC waveform from a utility feed into a DC waveform. The second PWM converter is coupled to the first PWM converter, the DC-link, and a load. The second PWM converter is configured to convert the DC waveform from the first PWM converter into an output AC waveform for the load. The control module is configured to: monitor a voltage and a current of the input AC waveform from the utility feed; monitor a voltage and a current of the output AC waveform for the load; provide one or more first instructions to maintain a unity power factor from the utility feed; provide one or more second instructions to draw a sinusoidal current from the utility feed; provide one or more third instructions to regulate the voltage of the output AC waveform for the load; provide one or more fourth instructions to inject power flow into the utility feed at the unity power factor; and measure an amount of energy flowing into an out of the first PWM converter. A neutral line from the utility feed is coupled to the first PWM converter, the DC-link, and the second PWM converter.

Certain embodiments of the present disclosure may provide one or more technical advantages. For example, customers can enjoy 100% of photovoltaic (PV), enjoy high quality of electricity, and reduce their utility bills. As another example, utility companies can defer their investment costs, reduce power delivery losses, and enjoy advanced grid application. Certain embodiments require no central coordination between individual end users and the distribution system operator, which provides a solution that is easily scalable.

Certain embodiments include a front end pulse-width modulation (PWM) converter connected to the distribution utility terminals, which allows for bidirectional power flow. The front end converter can be controlled to maintain unity input power factor and draw sinusoidal current (negligible harmonics) from the distribution utility under a wide range of operating conditions. Maintaining unity power factor minimizes line losses in the feeder and the distribution system, resulting in significant reduction in operating cost of the distribution system. Maintaining sinusoidal input current at the PINE module Input terminals ensures minimum distribution feeder losses at any given instant.

Certain embodiments may provide one or more of the following technical advantages: (i) maximization of solar integration without curtailment; (ii) minimization of line current and elimination of lower order harmonics so as to minimize the delivery loss; (iii) minimization of the need for capital investment in the distribution system for voltage support; (iv) ability for loads to engage in peer-to-peer power transfers/trades between proximal loads that are neighbors; (v) ability to disaggregate and meter power supplied from the grid versus distributed generation; (vi) deployability of solution in legacy systems as well as greenfield solutions; and (vii) maximum flexibility of the solution with respect to future adaptation of the power grid to unanticipated technological developments.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION

Traditionally, distribution utilities operation has at least three major objectives. A first objective is to maintain reliability. Whenever there is a fault, switches are operated in such a way that the fault is isolated, and the affected area is restored quickly. A second objective is to minimize delivery losses since delivery losses are paid by the utility company, not the customer. For the given amount of real power delivery, it is desirable to minimize the delivery losses to maximize the profit and social welfare. A third goal is the delivery of high quality electricity, especially regarding the voltage magnitude and power factor. Ideally, the voltage magnitude at each node of a distribution system should be within a certain range, no matter the time of day or the loading of the system.

These objectives are typically achieved via a distribution management system (DMS). One of the functions of a DMS is fault isolation and service restoration (FISR). FISR controls the opening and closing of circuit breakers to increase reliability. Another function of a DMS is voltage VAR control (VVC). VVC controls voltage control devices, such as load tap changers, voltage regulators, and capacitor banks to minimize the delivery losses while maintaining a good voltage profile along feeders.

Figure 1:
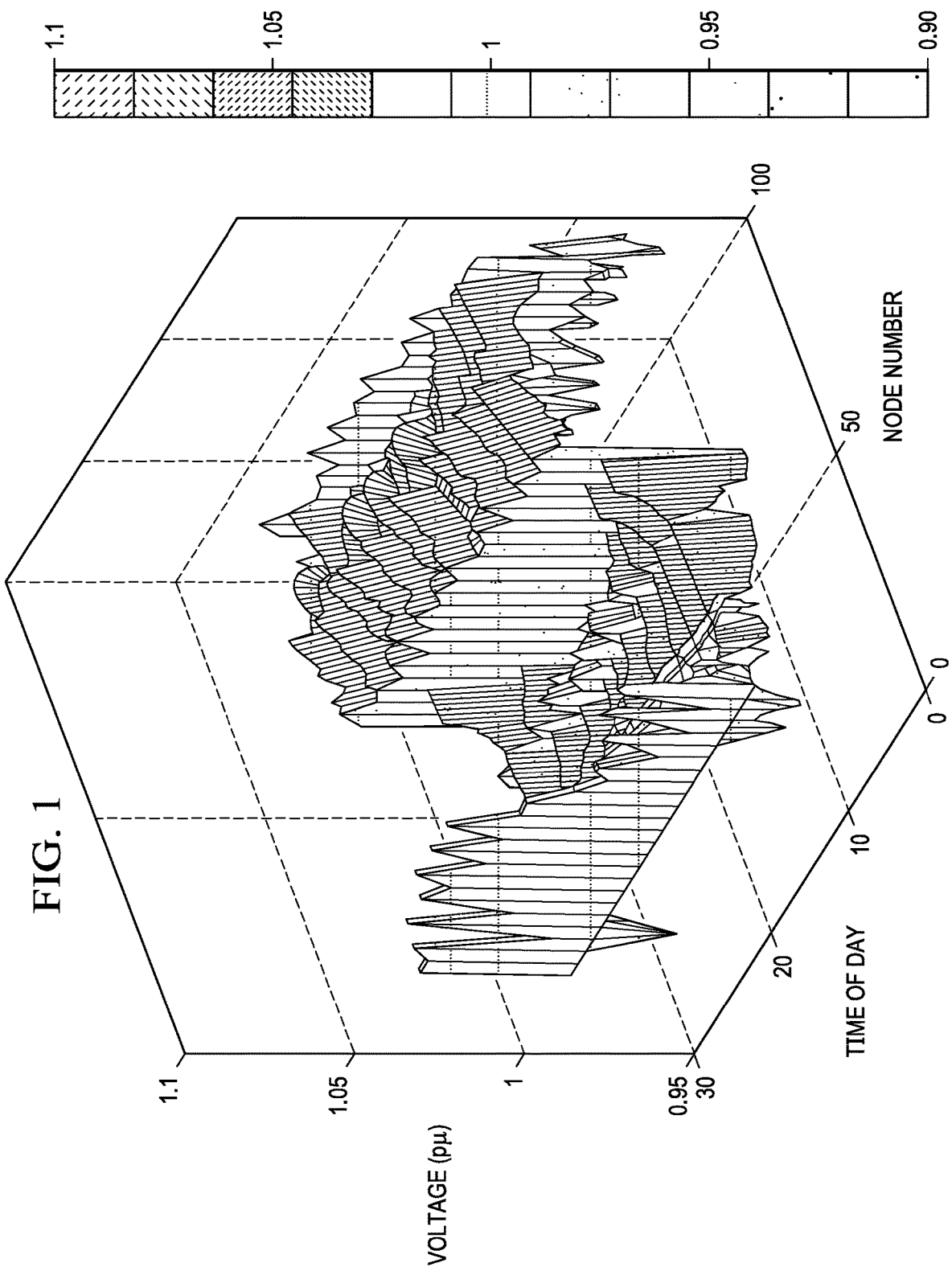
FIG. 1 illustrates a voltage profile with a typical voltage control scheme, according to certain embodiments.
Figure 2A:
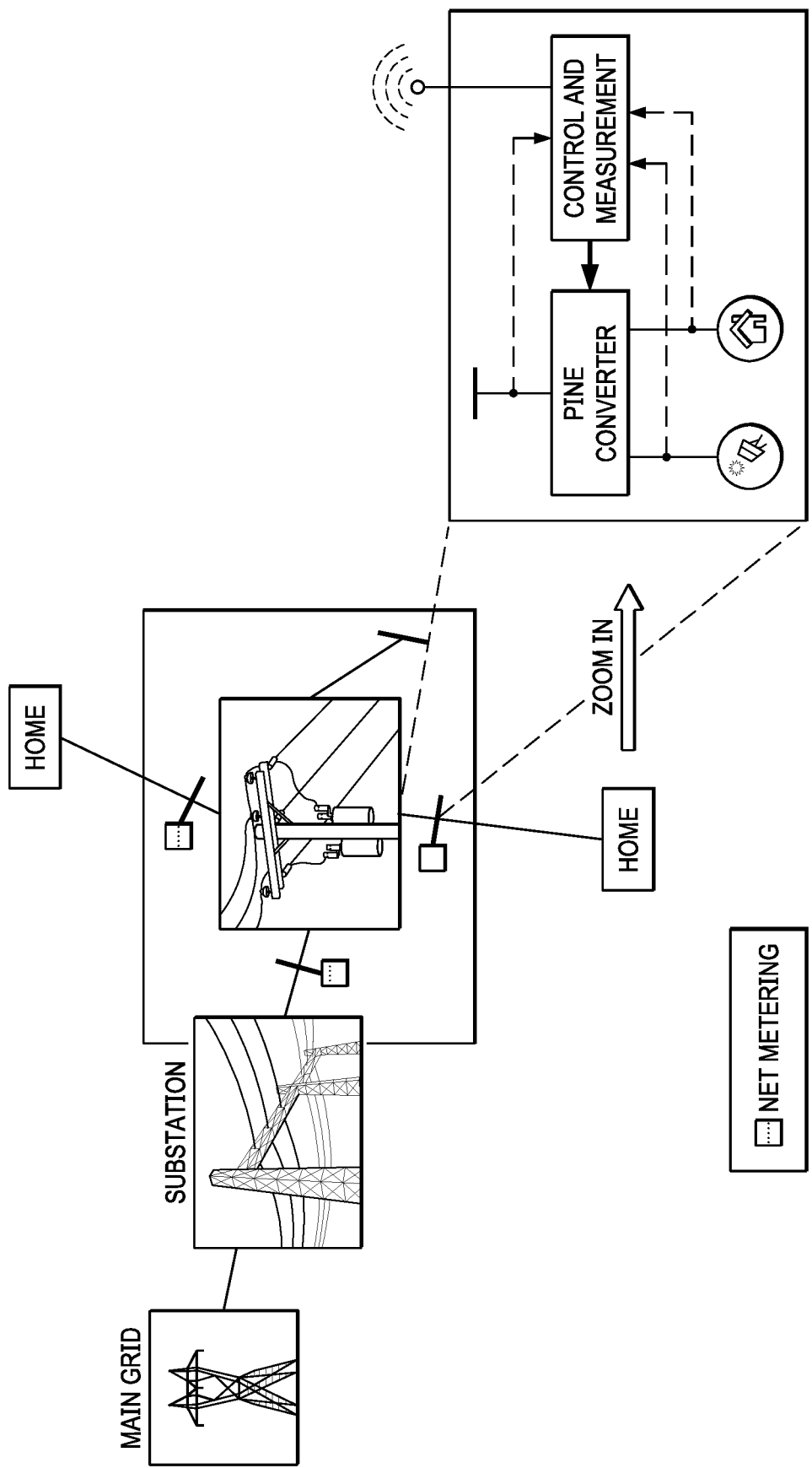
FIGS. 2A-2D illustrate various installations of PINE for both infrastructure and end-users, according to certain embodiments.
Figure 2B:
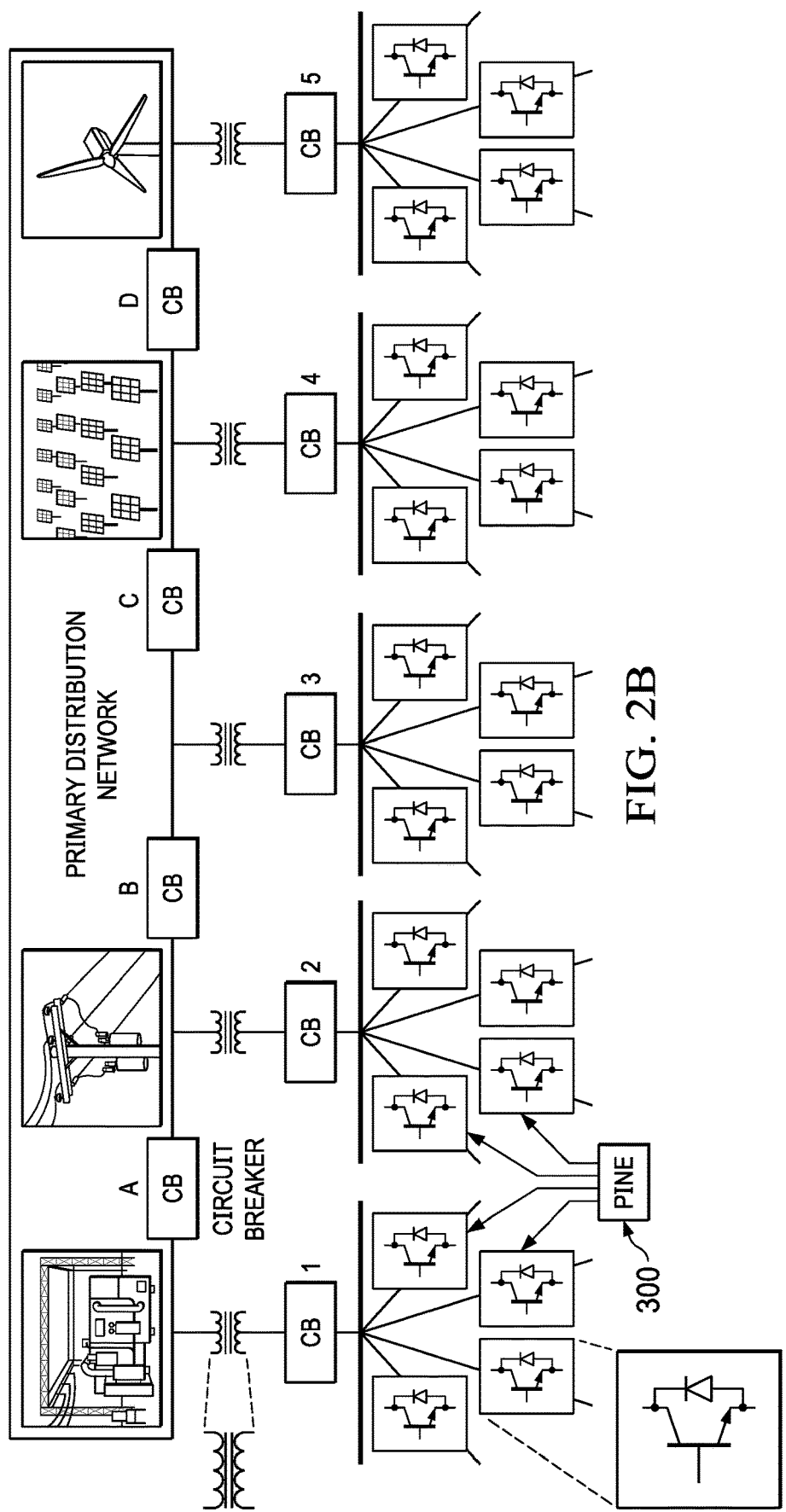
Figure 2C:
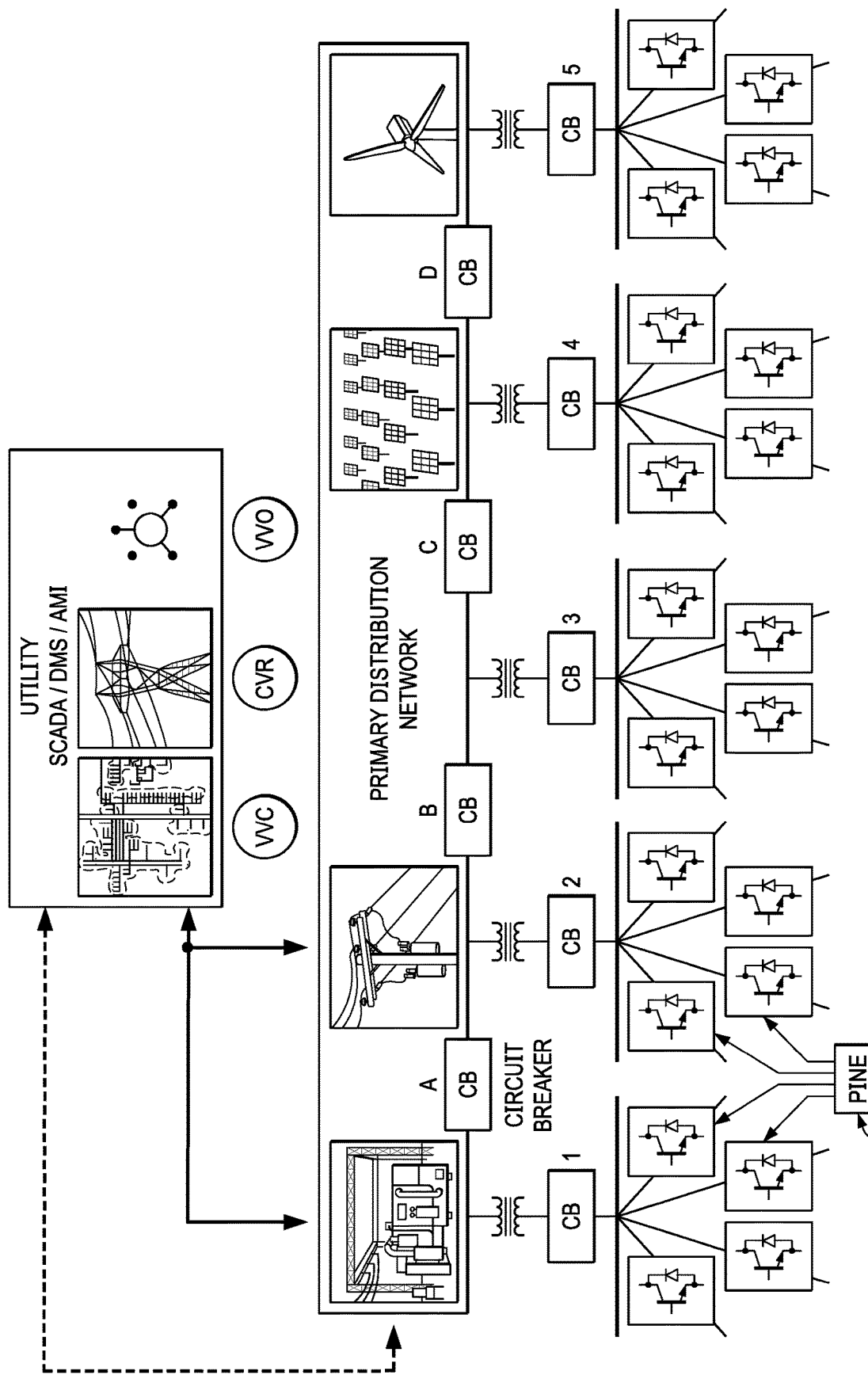
Figure 2D:
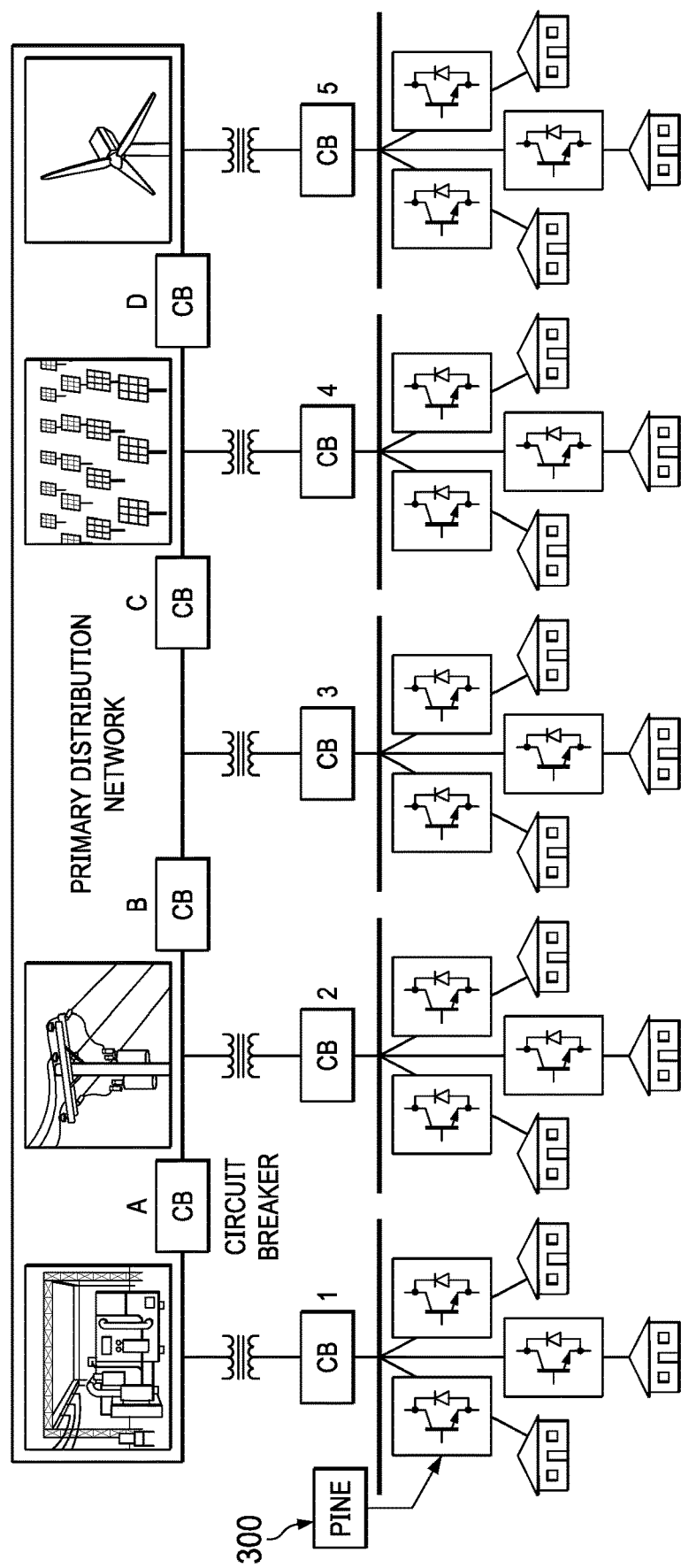

VVC typically works well. However, with high penetration of photovoltaics (PV) and other renewable energy sources varying their output over time in an unpredicted manner, maintaining a good voltage profile becomes challenging due to the low spatial and temporal resolution of voltage control devices. Additionally, the challenges to maintain a good voltage profile limit how much PV or other renewable energy sources can be connected in distribution systems. Typically, distribution systems do not have many voltage control devices. For example, in IEEE 123 test feeders, there is one load tap changer, four voltage regulators, and four capacitor banks. But using these nine voltage control devices to maintain the voltage magnitude of many (e.g., 123) nodes is difficult. In addition, because voltage control devices are mechanical devices, the operating time is much longer and there is a limit on how many times a day these devices can operate. These control devices would not be sufficient to respond to the fast fluctuation of end-user's net consumption. FIG. 1 shows the voltage profile of IEEE 123 test feeder with 1000% PV penetration and with normal solar radiance fluctuation pattern. This voltage profile is not desirable or satisfactory.

On the other hand, most distributed energy resources interface with power electronics converters. It is possible to take advantage of existing power electronics converters. They offer disruptive opportunities for a complete bottom up approach to simultaneously maintain end user quality of electricity and achieve utility business objectives.

To address these and other problems with existing systems and devices, a new and novel framework called power electronics intelligence at the network edge (PINE) technology is disclosed. PINE generally includes a power electronics-enabled technology and control framework that is distributed down to the end-user level (e.g., the network edge such as at homes or neighborhoods). As shown in FIGS. 2A-2D, the distribution system does not need to be very sophisticated and in fact can be considerably loosened and simplified compared to existing systems by embedding the intelligence at the edge of the grid (i.e., the end-user level). The power delivered to each end-user load is processed via an intelligent power electronic converter, herein called a PINE converter (i.e., PINE converter 300). This architecture makes plug and play end-user solar integration (or other generically distributed energy resources) very simple, as well as for the utility's Voltage/Var optimization. It therefore caters to the evolving needs of both the end-user as well as the distribution system.

Some key differences between the disclosed embodiments and other existing technologies include (but are not limited to): (a) the disclosed embodiments are typically deployed at the very edge of the network (i.e., behind the meter); (b) some embodiments not only are capable of maintaining a constant or near-constant end-user voltage, but they also are capable of maintaining the unity power factor at the grid interface level; (c) some embodiments are capable of injecting reactive power at the distribution edge on demand; and (d) some embodiments are based on distributed decision-making without any need for coordination.

Figure 3:
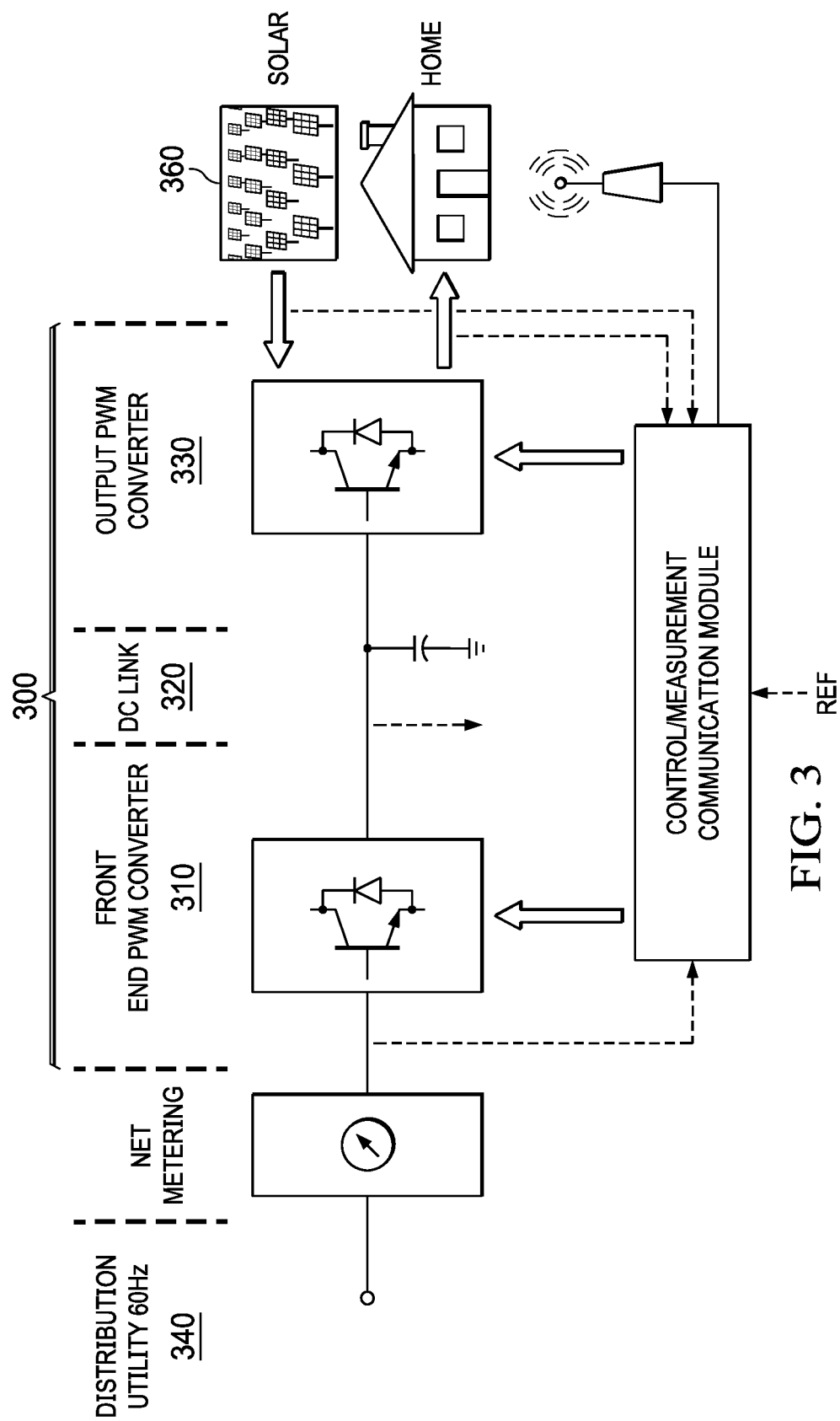
FIG. 3 illustrates the use of PINE at an end-user's home, according to certain embodiments.
Figure 4:
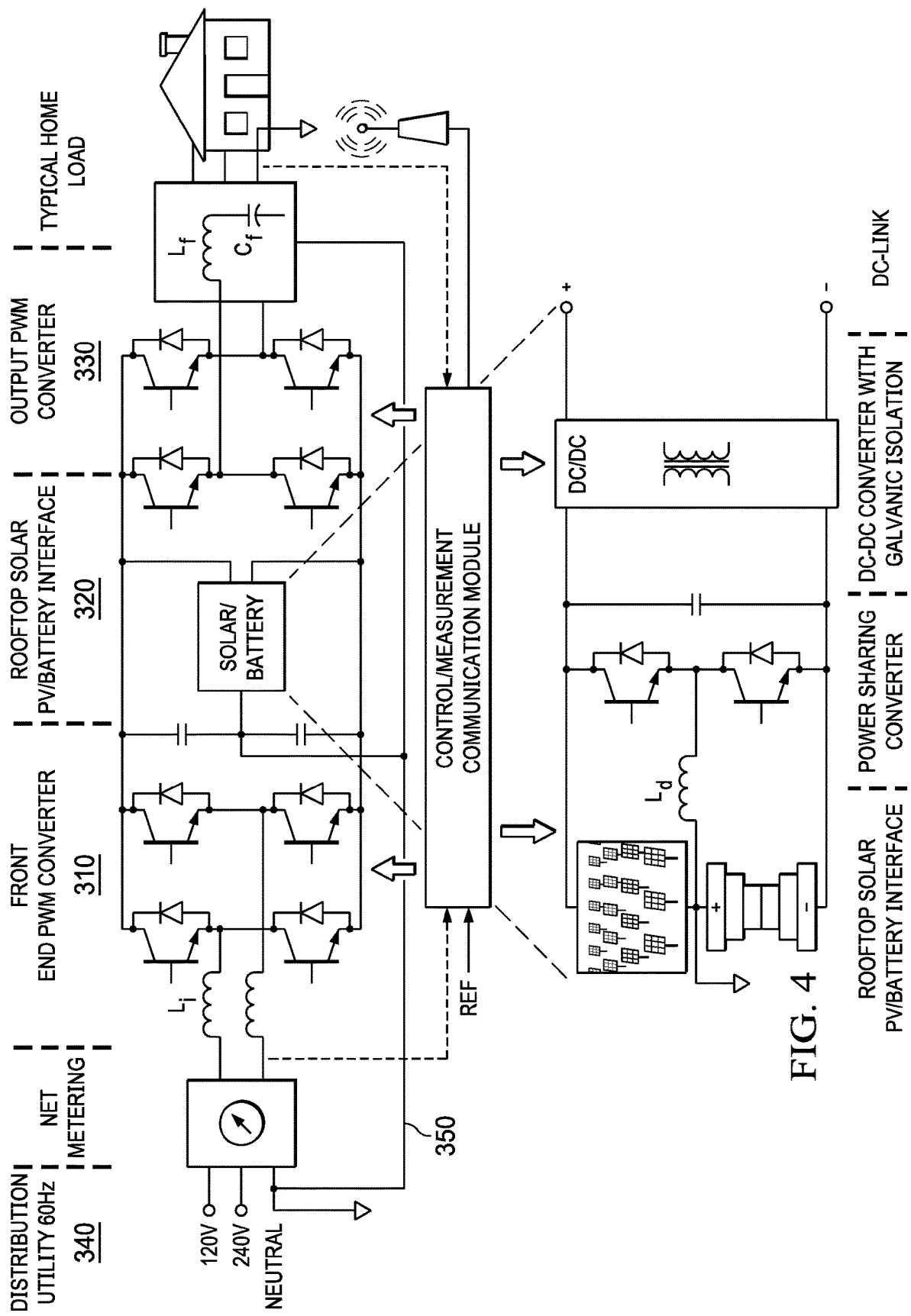
FIG. 4 illustrates a circuit topology of PINE, according to certain embodiments.

An example embodiment of a PINE converter 300 is illustrated in FIG. 3. A detailed circuit topology consisting of an active rectifier stage 310, DC-link 320, and inverter/output-filter stage 330 to power the 120/240V split phase loads in a typical home is shown in FIG. 4.

In some embodiments, the front end of PINE converter 300 (i.e., front end PWM converter 310) is connected to the distribution system 340 and converts AC waveforms to DC waveforms. This circuit is designed to be able to operate over a wide range of input voltages, such as 0.7 pu to 1.3 pu. This is one of the key factors that makes PINE technology unique. In addition, this circuit allows bidirectional power flow and independent real and reactive power control. For example, the reactive power can be controlled such that PINE converter 300 has unity input power factor. Moreover, this circuit can be controlled such that the input current drawn from distribution system is pure sinusoidal current. In some embodiments, no or few harmonics exist in the current. With unity power factor and minimized harmonics present in the current, the line losses, overheating and k-rating of transformer in the feeder and the distribution system are greatly reduced.

The output PWM converter 330 converts DC to AC and generates split phase AC output (120/240V, 60 Hz) suitable for a home load. In some embodiments, a generically distributed energy resource 360 (e.g., rooftop solar) supplies energy to PWM converter 330. In some embodiments, the output L-C filter of the output PWM converter 330 is designed such that sinusoidal output voltages will be maintained under a variety of linear/non-linear/unbalanced load conditions. Moreover, a digital closed loop control of the entire system may generate regulated output voltage at the output terminals under a wide variety of input utility distribution voltage conditions.

The middle stage PINE converter 300, the DC-link 320, can function as the energy hub. Installed roof-top solar and/or battery energy storage devices may be interfaced at the DC-link 320 via a unique power sharing converter as shown, followed by a DC-DC boost converter (see FIG. 4). Independent electronic control of the roof-top solar system to extract maximum power via maximum power point tracking (MPPT) along with simultaneous adjustment of charge discharge rates of the battery energy storage device are possible via closed loop control of the high frequency PWM converter 310. In addition, the proposed approach allows for providing a ground reference to the solar-PV and battery energy storage system for safety.

In some embodiments, neutral 350 from the distribution utility 340 is distributed to various portions of PINE converter 300, as illustrated. In some embodiments, neutral 350 is coupled to the middle of the rectifier of front end PWM converter 310, the output L-C filter of output PWM converter 330, and DC-DC link 320, as illustrated.

Some embodiment of PINE converter 300 may include other features. First, when solar generation exceeds the local load demand, some embodiments of PINE converter 300 can inject power flow into the distribution utility at unity power factor. Second, some embodiments of PINE converter 300 can enable power exchange among peer end users by independently controlling real and reactive power injection. Third, some embodiments of PINE converter 300 include a measurement module that can be designed such that the net energy transacted to neighbors and from the utility can be measured. This essentially replaces the functionality of a smart meter.

Figure 5:
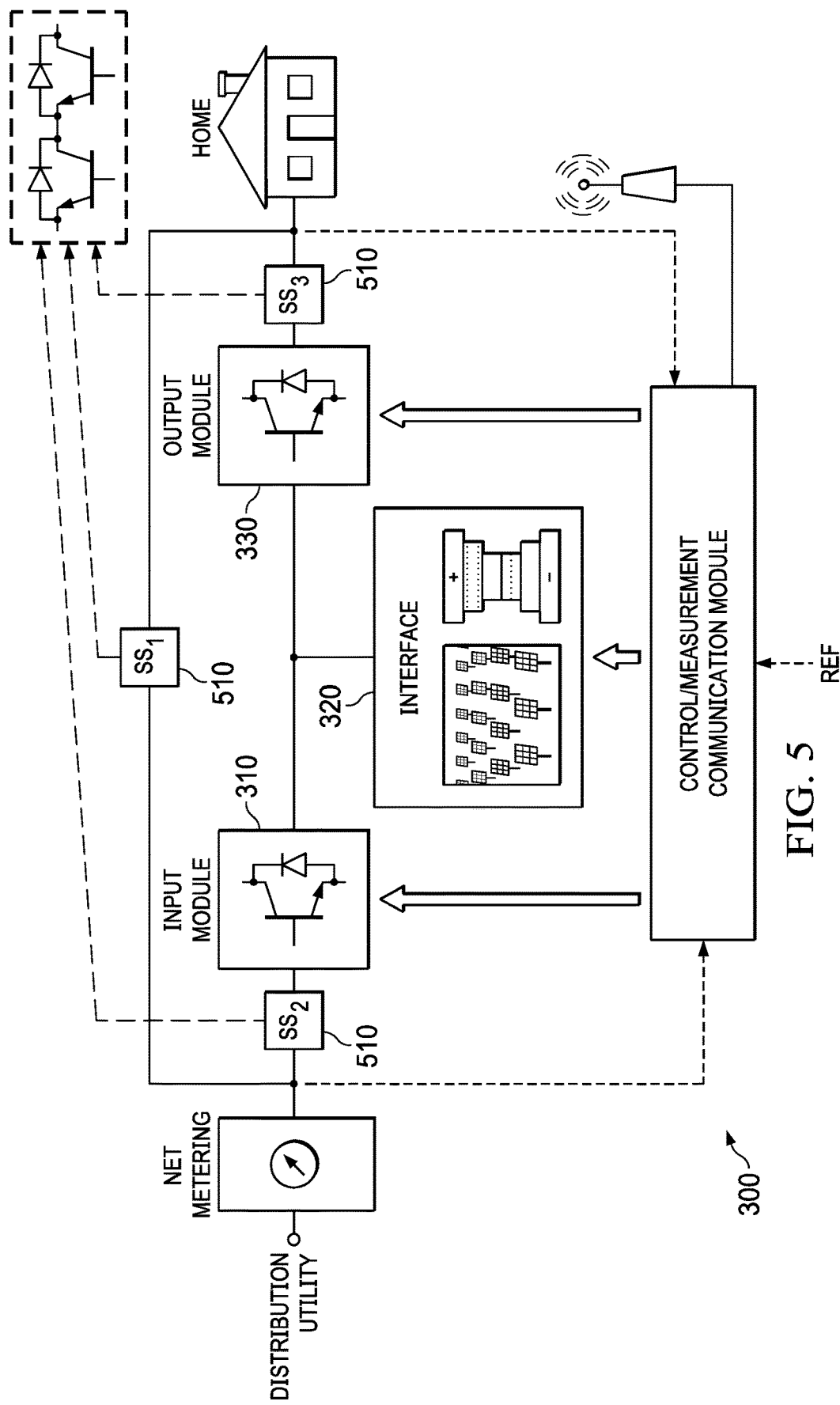
FIG. 5 illustrates PINE with fast acting static switches, according to certain embodiments.

In order to achieve high reliability, some embodiments of PINE converter 300 have the ability to operate under faulty conditions. FIG. 5 shows the block diagram of the reconfigurable PINE converter 300 with fast acting static switches (SS) 510 to provide uninterruptable power to the home under fault conditions. Under normal conditions, $SS_1$ is open and $SS_2$ and $SS_3$ are closed to power the home via PINE converter 300. The topology also allows for completely bypassing the PINE converter 300 (by closing $SS_1$ and opening $SS_2$ and $SS_3$) in cases of failure and power the home directly from the utility. By opening $SS_1$ and $SS_3$ and by closing $SS_2$, solar/battery power can be channeled to the utility in case the output module has failed. In the case of input module failure, $SS_2$ may be opened and $SS_1$ and $SS_3$ may be closed to supply the home via the utility and installed solar-PV/battery system.

In general, the solid state circuit breaker $SS_1$ functions as a complete bypass of PINE converter 300. In cases where PINE converter 300 is faulted, the power to the house can be restored by opening $SS_2$ and $SS_3$ and closing $SS_1$. In addition, PINE converter 300 can be configured as a smart inverter by the following operation: close $SS_1$ so that electric power to the house is supplied by the utility, open $SS_3$ to disconnect PINE converter 300 from the output load (e.g., a house), close $SS_2$ to process the connected generically distributed energy resource 360 (e.g., solar, PV and battery) in order to supply power back to the utility, and control the input module to inject reactive power back to the utility.

The benefits of PINE can be described from the end-user's perspective, the utility's perspective, and social welfare perspectives. First, PINE can help end-users reduce their utility bill. With PINE, end-users can take full advantage of installed PV capacity, capacity generated by other renewable energy sources (e.g., wind), or a combination of these. No or minimal PV or renewable energy source curtailment is necessary anymore. Better utilization of PV generation reduces the amount of electricity purchased from utility and the peak demand. This will in turn reduce energy charge and power charge on the users' electricity bill. Furthermore, because of the unity power factor of the PINE converter, end-users do not need to pay a power factor penalty.

PINE can serve as an energy hub for customers. Different components, such as electric vehicles, PV panels, and energy storage can be interfaced via a PINE converter. The power exchange between these components may be possible. By using an intelligent power management system, end-users can perform electricity arbitrage, further increasing economic benefits for customers.

PINE enables each individual end-user to function as a microgrid. To accomplish this, the voltage set point at the interface between the PINE converter and the utility grid can be configured in both magnitude and phase angle. By provisioning the voltage set point signals, individual end users can be organized to function as a standalone microgrid. In addition, because of the energy storage, on-site PV generation, and intelligent control of the PINE converter, end-users may still have electricity despite the distribution system being down. End-users may even disconnect themselves from the utility when necessary. For example, a solid state circuit breaker (e.g., $SS_2$ illustrated in FIG. 5) can be controlled to disconnect the PINE converter from the utility when desired.

PINE can also provide benefits for utility companies. PINE can reduce utility operation cost. Delivery losses can be greatly reduced due to reactive power injection capability, the reduction or elimination of harmonics, and the voltage relaxation. The detailed calculation is shown in more detail below. Moreover, PINE can increase the effectiveness of voltage conversion reduction (VCR) to reduce the loading of the distribution system. Previously, due to the low resolution of spatial and temporal voltage control devices, voltage profiles could not be reduced significantly. The voltage at the upstream generally needs to be high enough so that the voltage at the downstream can be at the minimum required voltage magnitude. Therefore, some part of the feeder has higher voltage while other parts of the feeder have lower voltage. The uniformly low voltage along the feeder is generally not possible. However, with much higher resolution of spatial and temporal PINE control, the voltage profile can be reduced in such a way that the voltage at all buses can be reduced to the minimum required voltage, maximizing the impact of VCR.

PINE may allow deferment of capital investment requirements, such as line upgrades and voltage control device upgrades. This is because PINE may relax the voltage requirement. Previously, as the load grew, systems needed to be upgraded to serve the increased load. But with PINE technology, distribution systems do not need to upgrade the line to reduce voltage drop for the increased load. The load reach of the distribution system with the same infrastructure is increased. Moreover, voltage relaxation also allows the utility to defer the investment of voltage control devices. No complicated voltage control scheme may be needed by utilizing PINE, which may be used to control voltage.

PINE may also defer the investment requirements of transformers by improving the voltage profile at the end user level and eliminating the harmonics components in the distribution grid. Therefore, the need to invest in capacitor banks (for voltage regulation) and in transformers could be deferred due to the higher quality of power enabled by PINE. In addition, by reducing or eliminating the harmonics of the system, PINE allows the effective line capacity and transformer rating (K rating) to be increased. For the same line and transformer, the amount of the load that can be served is increased.

PINE may enable advanced applications of distribution systems. Because some embodiments of PINE have built-in sensors and communications, the state of the distribution system can be observed down to the customer level. With a higher sampling rate of PINE measurement, the loading information of customers and feeders can be measured more accurately. The load forecast of the load can be further improved with a high amount of load data. In some embodiments, the communication requirement is not very high and an extended refresh rate (e.g., two seconds) may be enough for distribution system operation. This communication can be done via Ethernet or wireless communications such as Wi-fi or microwave, further reducing the cost of system communications. By using signal processing and big data techniques, the loading in each phase, the distribution system topology, and the status of each lateral can be determined or estimated. With this information, advanced application of distribution systems can be achieved.

PINE can also implement energy budgeting aspects. PINE converter 300 can be controlled to enter into a real-power (watts) output limit control in which each home can only power loads up to the allocated watts.

For example, the fault isolation and service restoration (FISR) can be further improved due to the detailed information of the feeder. The location of the fault can be identified more quickly and more accurately. Another example is that by controlling the real and reactive power injection, the distribution system can be operated in a much more balanced way, further decreasing power delivery loss. Previously, to make unbalanced distribution systems more balanced, the operation needed to mechanically switch the load from certain phases to other phases. The speed of mechanical switches is typically slow and there is a limit on how many times a mechanical switch can be operated. With PINE technology, switching is much faster and there is no limit regarding the control of real and reactive power control to make the system more balanced.

PINE technology can increase social welfare. With independent control of real and reactive power converters for each PINE converter, and with much easier utility operation and control, it may be possible to achieve peer-to-peer energy transaction among neighbors (in the same secondary feeder) or even among neighbors in different primary feeder locations. With this peer-to-peer energy transaction, end-users can sell their surplus energy either to the utility or to other users, making the best out of generated electricity.

Figure 6:
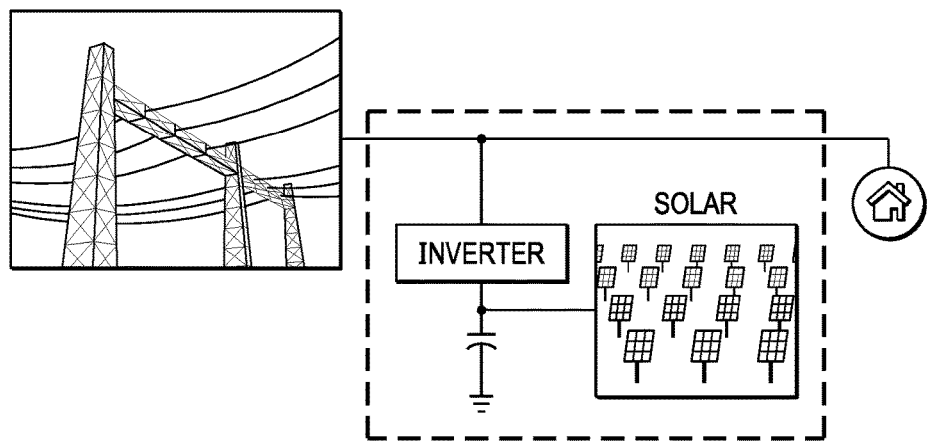
FIGS. 6-7 illustrate using an existing inverter with PINE, according to certain embodiments.
Figure 7:
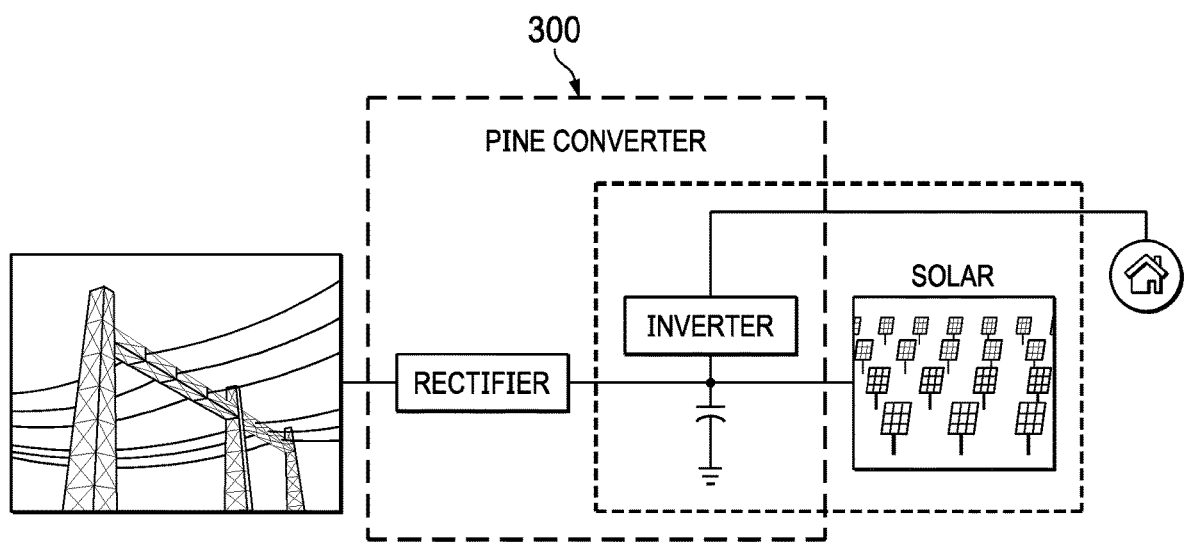

In some embodiments, the cost of utilizing PINE may be reduced or offset by utilizing components already in use by end-users (e.g., PV inverters, as shown in FIG. 6). For example, as illustrated in FIG. 7, already-installed PV inverters in a home may be utilized to function as the output PWM converter 330. This can be accomplished by changing or modifying the controllers of these PV inverters. In this scenario, end-users may only need to purchase other components of PINE converter 300 such as the front end PWM converter 310, shown in FIG. 3.

To minimize or significantly reduce power delivery loss, reactive power injection capability of PINE converter 300 can be used. Because PINE converters 300 may be located at the very edge of the network, the number of control variables is much larger.

The first and simplest way is to locally control PINE converters 300 such that all PINE converters 300 have unity power factor. For a given amount of real power demand, with zero reactive power demand, the current flow of the branches to which the PINE converters 300 are connected is minimum. This can be shown by using a simple two bus example. Given the source voltage $\vec{V}_1$ and real power load demand P, the current flowing on the branch can be found by solving the following equations:

$$\vec{V}_2 = \vec{V}_2 I - (R+jX)\vec{I} \quad (1)$$

$$\vec{V}_2 \vec{I}^* = P+jQ \quad (2)$$

The magnitude of $\vec{I}$ can be found as $$I^2 = \frac{-B \pm \sqrt{B^2 - 4(R^2+X^2)(P^2+Q^2)}}{2(R^2+X^2)} \quad (3)$$

where $B=2PR+2QX-V_1^2$. It can be shown that when Q=0, $dI^2/dQ=0$. Therefore, the power delivery loss for these branches is minimized or significantly reduced if there is no reactive power load.

Note that this scheme does not result in minimized total delivery losses, because other branches, especially the branches on primary feeder branches, do not have minimized current flow. The upper branch current is a vector sum of the lower branch current. For example, suppose branch 1 is upper branch while branch 2 and branch 3 are lower branches. The relationship between the current phasor of these branches is $I_1=\vec{I}_2+\vec{I}_3$. Even though the current magnitude of each lower branch current, $|I_2|$ and $|I_3|$ is minimized, the resulting current magnitude, $|I_1|$ is not necessarily minimum because of the impact of angle, $\theta_2$ and $\theta_3$.

The second way is to determine reactive power injection off-line. The reactive power injection can be calculated via a centralized optimization problem with a given system parameter and loading information. For different times of the day, with different input of the optimization problem, the resulting reactive power injection can be calculated. The results can be stored in the memory of controllers. Based on the time of the day, the reactive power injection can be determined by looking into the memory. Even though this may not lead to the optimal reactive power dispatch, it could give a satisfactory result. Moreover, with this scheme, no complicated communication and real-time computation are needed. A scenario-based stochastic optimization technique may be used to achieve minimum expected delivery loss.

In general, there are two optimizations to be solved. In the case where all customers have a PINE converter 300, voltage can vary in a wide range. The voltage constraints can be eliminated. The corresponding optimization is $$\min_{Q_k} \sum_{i,k} r_{i,k} \frac{|S_{ik}|^2}{|V_i|^2} \quad (4)$$

-continued subject to $$V_0 = V^s$$

$$|V_k|^2 = |V_i|^2 - 2(r_{ik}P_{ik} + x_{ik}Q_{ik}) + |z_{ik}|^2 \frac{|S_{ik}|^2}{|V_i|^2}, k \in N$$

$$P_{ik} = \sum_{j \in H_k} P_{kj} + P_k^d + r_{ik}\frac{|S_{ik}|^2}{|V_i|^2}, k \in N$$

$$Q_{ik} = \sum_{j \in H_k} Q_{kj} + x_{ik}\frac{|S_{ik}|^2}{|V_i|^2} + Q_k, k \in N$$

where $r_{ij}$ and $x_{ij}$ are the line resistance and reactance, $z_{ij}=r_{ij}+jx_{ij}$, $S_{ij}$, $P_{ij}$ and $Q_{ij}$ are the complex, real and reactive power flow of branch ij, $V_k$, $P_k^d$ and $Q_k$ are voltage phasor, real power load and reactive power injection at bus k, N is the set of buses, $H_k$ is the set of buses connected to bus k. However, in some embodiments, not all customers will have a PINE converter 300. For these customers, the voltage magnitude should be maintained within the required range. The voltage regulation can be achieved by dispatching reactive power injection of existing PINE converters 300 and using traditional voltage control devices, such as LTC, voltage regulators and capacitor banks. The reactive power dispatch problem can be written as the following optimization problem.

$$\underset{\substack{Q_k \\ k \in N_{PINE}}}{\text{Min}} \sum_{i,k} r_{i,k} \frac{|S_{ik}|^2}{|V_i|^2} \quad (5)$$

subject to $$V_0 = V^s$$

$$|V_k|^2 = |V_i|^2 - 2(r_{ik}P_{ik} + x_{ik}Q_{ik}) + |z_{ik}|^2 \frac{|S_{ik}|^2}{|V_i|^2}, k \in N$$

$$P_{ik} = \sum_{j \in H_k} P_{kj} + P_k^d + r_{ik}\frac{|S_{ik}|^2}{|V_i|^2}, k \in N$$

$$Q_{ik} = \sum_{j \in H_k} Q_{kj} + Q_k^d + x_{ik}\frac{|S_{ik}|^2}{|V_i|^2}, k \in N_{Non\text{-}PINE}$$

$$Q_{ik} = \sum_{j \in H_k} Q_{kj} + x_{ik}\frac{|S_{ik}|^2}{|V_i|^2} + Q_k, k \in N_{Non\text{-}PINE}$$

$$0.95 \leq V_k \leq 1.05, k \in N_{Non\text{-}PINE}$$

where $N_{PINE}$ is the set of buses with PINE and where $N_{Non\text{-}PINE}$ is the set of buses without PINE, respectively.

The third way is to use distributed optimization algorithms to solve the optimization problem. Distributed methods may be used to solve this problem, as well as model-free methodologies. Multiple big data analysis techniques and sensitivity methods may be used.

PINE can reduce power delivery loss significantly by reducing or eliminating harmonic current. The input current total harmonic distortion (THD) of a typical north-American home is 50% to 80%. In view of this, the $I^2R$ line losses in a distribution system is typically in the range of 6-10%. Suppose the current magnitude in fundamental frequency is I. The 3rd harmonic and 5th harmonic current magnitude are $I_3$ and $I_5$, respectively. The $I^2R$ line losses with current harmonics are $(I^2+I_3^2+I_5^2)R$ while the system loss without harmonics is $I^2R$. In the typical system, $I_3=0.7I$ and $I_5=0.5I$. Since PINE converter 300 may draw harmonic-free current (i.e. 0% THD), the loss is reduced from $1:74I^2R$ to $I^2R$, about 40% power deliver loss reduction.

In addition to reducing power delivery losses, PINE technology also eliminates overheating of capacitor banks/distribution transformers caused by distribution harmonic currents. The net reduction in RMS current drawn by a typical home due to PINE converter 300 may also result in increasing distribution system capacity to supply additional homes on the same feeder.

With PINE, bus voltages in the system can be in a larger range. This relaxed voltage enables easier distribution system operation and allows higher penetration of PV. In addition, by increasing voltage magnitude, the loss can be reduced further. Suppose in the base case, the voltage is 1 pu and the current is 1 pu. If the voltage is increase to 1.3 pu, for the same load, the current is changed from 1 pu to 1/1.3=0.76 pu. Therefore, the loss of the system is changing from $1^2R=R$ to $0:76^2R=0:58R$.

Figure 8:
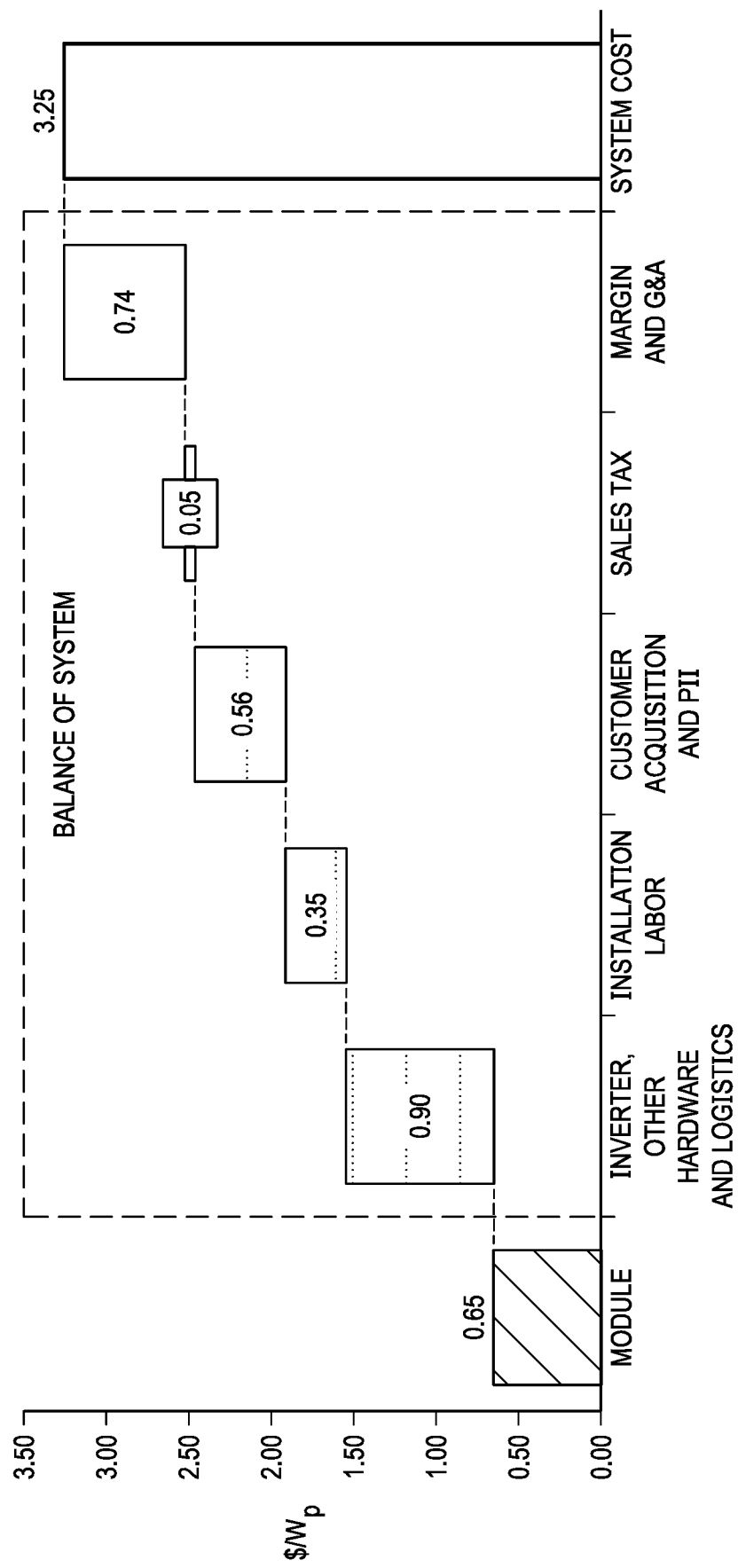
FIG. 8 illustrates estimated costs for residential PV systems, according to certain embodiments.
Figure 9:
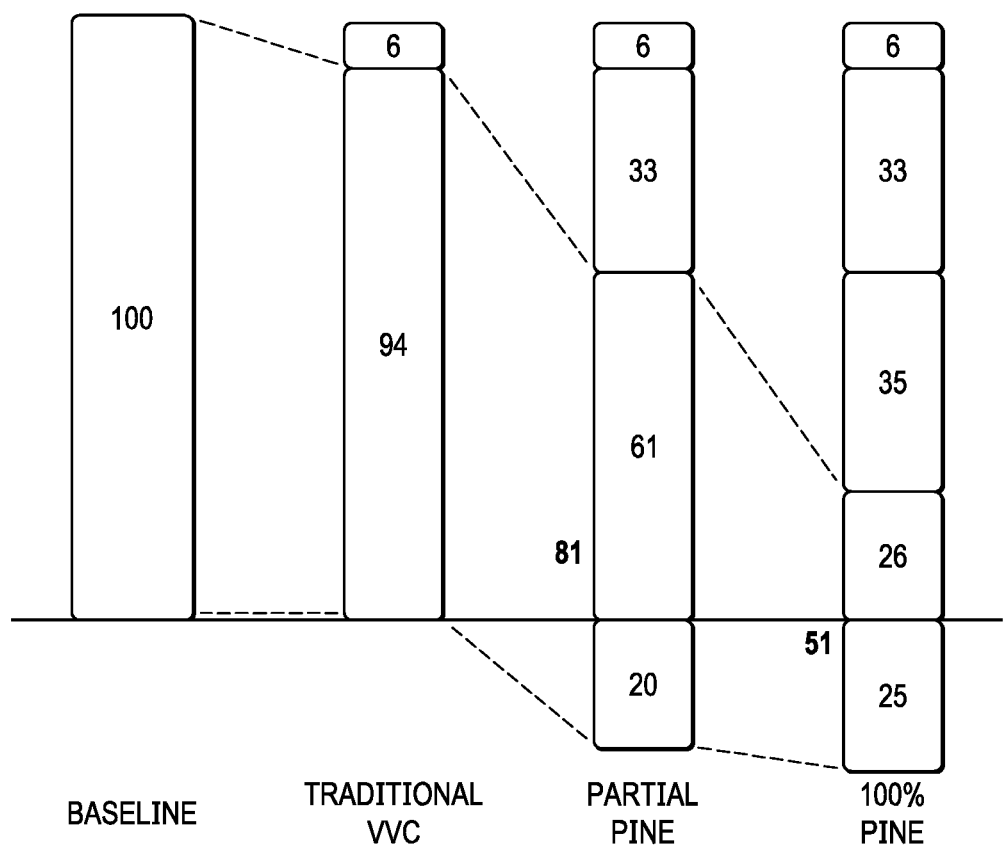
FIG. 9 illustrates a comparison of loss minimization schemes, according to certain embodiments.

FIG. 8 illustrates estimated costs for residential PV systems and FIG. 9 shows an example calculation for loss reduction. In this calculation, the efficiency of a PINE converter is assumed to be 95%. It can be seen that due to the elimination of harmonics and voltage relaxation, the loss can be decreased by about 50% while the power delivery loss reduction can be reduced by about 6%.

Figure 10:
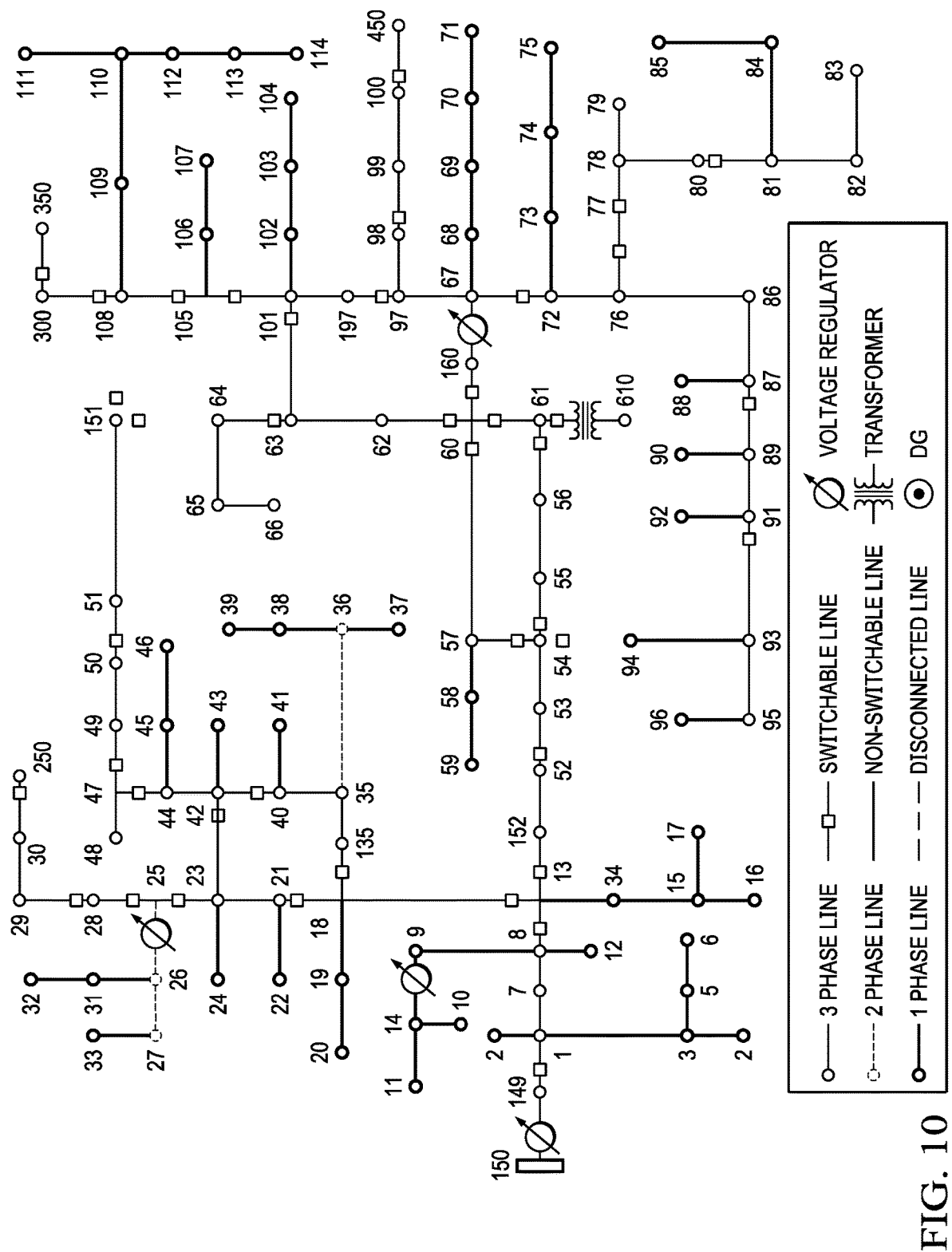
FIG. 10 illustrates an IEEE 123 test feeder, according to certain embodiments.
Figure 11:
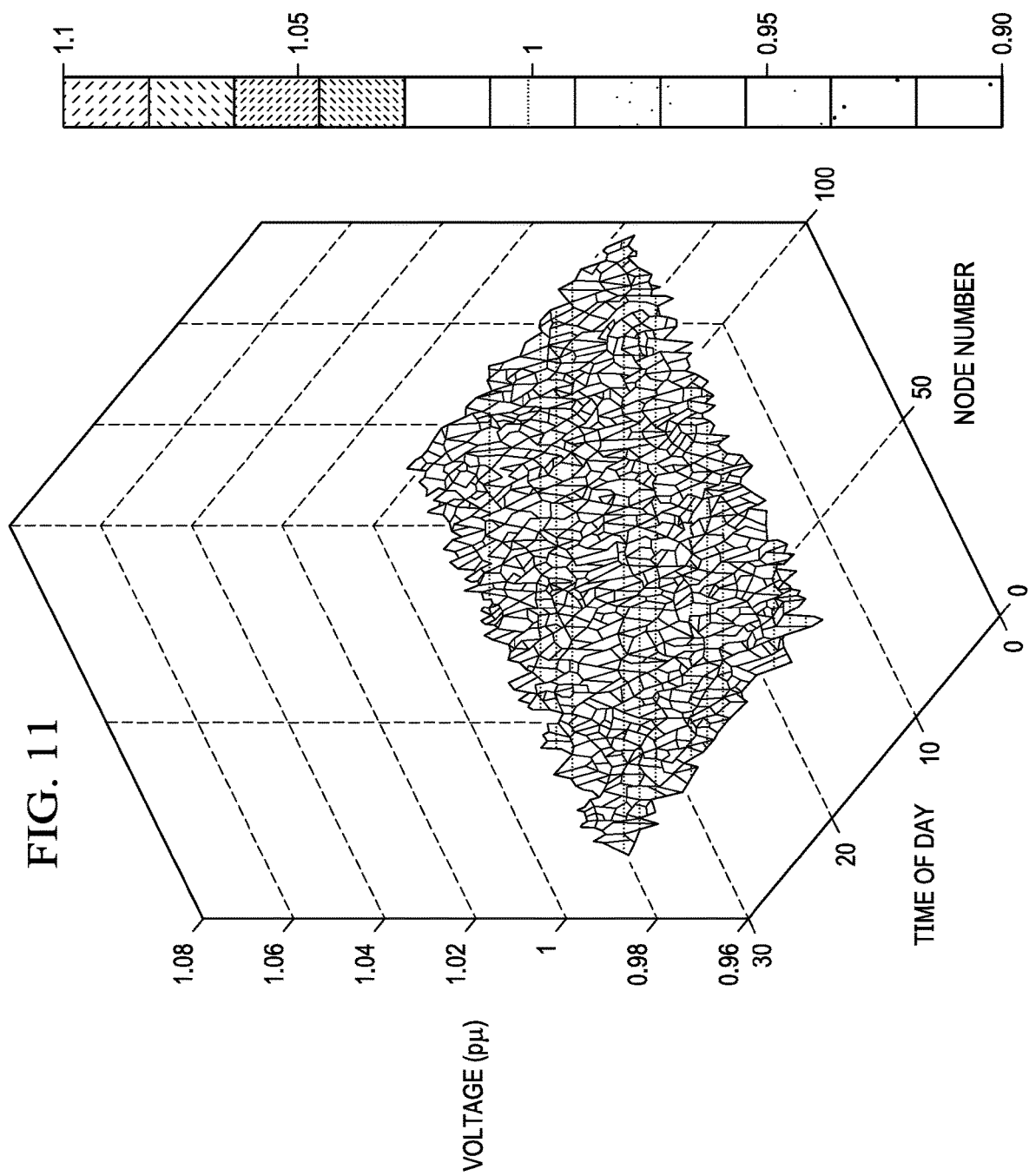
FIG. 11 illustrates voltage at a customer, according to certain embodiments.

FIG. 10 illustrates an example IEEE 123 test feeder system. The PV penetration level in this example is 100%. The PV generation varies throughout the whole day. Even though voltage control devices are used to maintain the voltage profile, the voltage profile of the system is not satisfactory due to the low temporal and spatial resolution of the voltage control devices. FIG. 1 shows the voltage profile in the base case. The voltage at certain nodes are outside the required range. However, with PINE technology, even though the voltage at the input side of the PINE converter fluctuates, the output of the PINE converter provides customers with perfect voltage magnitude, as shown in FIG. 11.

In addition to having a better voltage profile, the loss of the distribution system is minimized or significantly reduced. By using a simple and local control, each PINE converter 300 has a unity power factor. The resulting power delivery loss is therefore reduced. As seen from Table 1, depending on the loading factor, the loading level of the system, the loss reduction due to PINE is different.

TABLE 1

| Loading factor | Without PINE | With PINE |
| --- | --- | --- |
| 1 | 95.3 kW (2.7%) | 92.4 kW (2.61%) |
| 1.5 | 225.6 kW (4.35%) | 193.3 kW (3.69%) |
| 2 | 414.3 kW (6.13%) | 344.1 kW (4.93%) |

Power Delivery Losses Under Different Loading Factor without and with Pine

PINE technology enables the nodes at the very edge of distribution system, making these nodes intelligent and powerful. Customers can enjoy 100% of PV, enjoy high quality of electricity, and reduce their utility bill while utilities can defer their investment, reduce power delivery loss and enjoy advanced grid application. With PINE, a new paradigm of distribution systems is possible.

Figure 12:
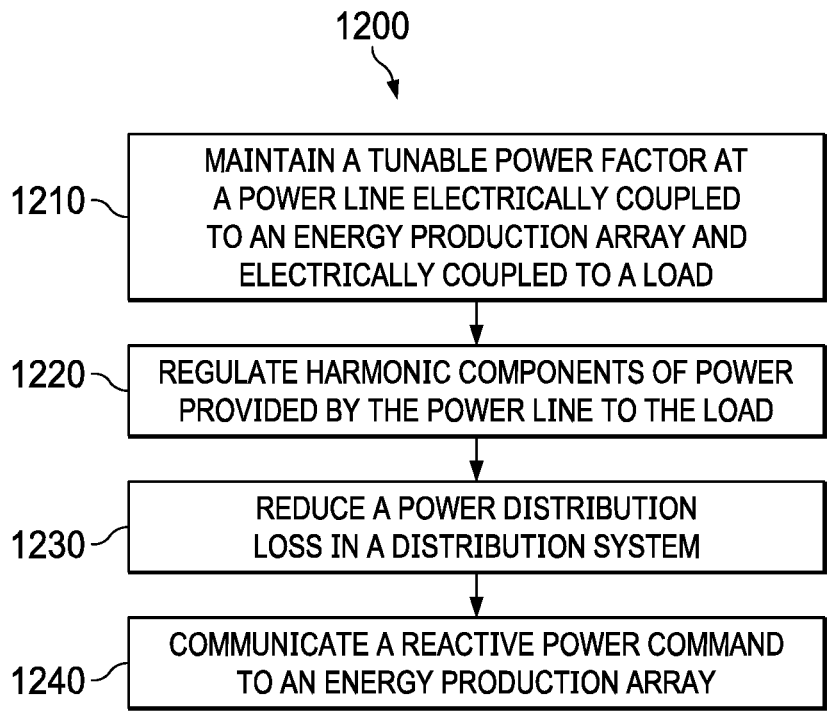
FIG. 12 illustrates a method that may be performed by PINE, according to certain embodiments.
Figure 13:
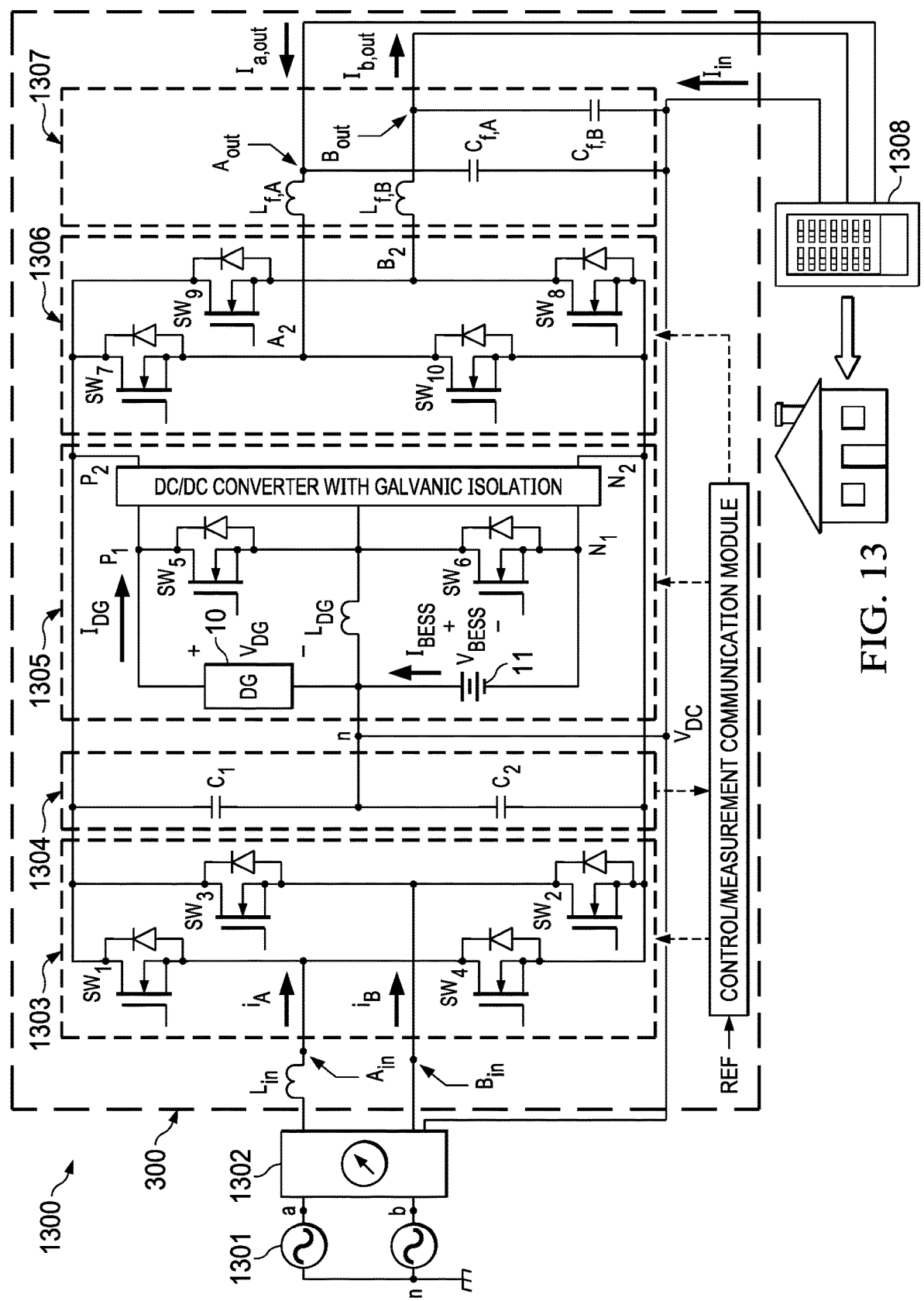
FIG. 13 illustrates a circuit with PINE that may enable energy budgeting.

FIG. 12 illustrates a method 1200 that may be performed by certain embodiments of PINE. In some embodiments, one or more steps of method 1200 may be performed by a control/measurement communication module of PINE, as illustrated in FIGS. 3-4. In some embodiments, the control/measurement communication module of PINE may include some or all components of computer system 1300, as illustrated in FIG. 13 and described below. In other embodiments, one or more steps of method 1200 may be performed by any other appropriate means.

In step 1210, method 1200 maintains a tunable power factor at a power line electrically coupled to an energy production array and electrically coupled to a load. In some embodiments, the energy production array is DC link 320, described above. In some embodiments, the load is a home. In some embodiments, step 1210 includes providing one or more instructions to front end PWM converter 310, DC link 320, and/or output PWM converter 330. In some embodiments, the one or more instructions are based on voltages and/or currents of the input power line and/or an output AC signal to the load.

In step 1220, method 1200 regulates harmonic components of power provided by the power line to the load. In some embodiments, this step involves controlling one or more of front end PWM converter 310, DC link 320, and output PWM converter 330 so that the input current drawn from the input power line is pure sinusoidal current.

In step 1230, method 1200 reduces a power distribution loss in a distribution system. In some embodiments, this step includes controlling one or more of front end PWM converter 310, DC link 320, and output PWM converter 330 in order to maintain a unity power factor. In some embodiments, this step includes controlling one or more of front end PWM converter 310, DC link 320, and output PWM converter 330 in order to maintain sinusoidal input current.

In step 1240, method 1200 communicates a reactive power command to the energy production array such as DC link 320. In some embodiments, this step enables power exchange among peer end users. In some embodiments, the reactive power command provides independent control of real and reactive power.

In some embodiments, method 1200 may include controlling one or more of front end PWM converter 310, DC link 320, and output PWM converter 330 in order to enact an energy budget. For example, the utility company may need to ration or control how much energy each home consumes during a disaster. As another example, the utility company may need to limit the amount of energy each home consumes during a heat wave in order to avoid brown-outs or black-outs. To accomplish this, the control/measurement communication module of PINE may receive instructions via a wireless (e.g., Wi-fi) or wired signal to enact an energy budget. The energy budget may be, for example, to draw only a certain amount of current during a certain time period. Based on the received instructions, the control/measurement communication module of PINE may provide one or more instructions to one or more of front end PWM converter 310, DC link 320, and output PWM converter 330 in order to enact the received energy budget. Example embodiments of circuits that may utilize PINE to provide energy budgeting are described below in reference to FIGS. 13 and 14.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method 1200 that includes the particular steps illustrated in FIG. 12, this disclosure contemplates any suitable method including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

In some embodiments, one or more computer-readable non-transitory storage media embodying one or more units of software are operable when executed to perform one or more of the steps of the method of FIG. 12. For example, the one or more computer-readable non-transitory storage media embodying one or more units of software are operable when executed to: maintain a tunable power factor at a power line electrically coupled to an energy production array and electrically coupled to a load; regulate harmonic components of power provided by the power line to the load; reduce a power distribution loss in a distribution system; and communicate a reactive power command to the energy production array.

FIG. 13 illustrates a circuit 1300 that utilizes a PINE converter 300 to provide energy budgeting. In some embodiments, circuit 1300 includes one or more utility inputs (i.e., voltage) 1301, a utility meter 1302, a PINE converter 300, and a circuit breaker panel 1308. PINE converter 300 includes a front-end PWM rectifier 1303, DC-link capacitors 1304, a converter 1305 for interfacing distributed generation (e.g., PV) and battery storage to DC-link 1304, an output PWM inverter 1306, and an output filter 1307. In general, circuit 1300 is capable of enabling energy budgeting based on power availability and may be enabled remotely. As an example, during a natural disaster such as a flood or hurricane, it may be desirable to control how much energy each home may draw (i.e., limit each home's current draw) in order to prevent blackouts. As another example, during especially hot or cold weather, it may be desirable to control the amount of energy each home is allowed to draw. To accomplish energy budgeting with circuit 1300, two strategies may be employed. First, the load may be controlled using smart home energy management devices with Internet-of-Things (IoT) technology enabled to control various loads in a typical home, since 80% of a residential load is fed through dedicated circuit breakers. In this scenario, circuit breaker panel 1308 may be fitted with electronic circuit breakers that may be enabled/disabled electronically. Circuit 1300 could be remotely controlled to disable certain electronic circuit breakers in certain situations. As a specific example, if a home has exceeded its energy budget during a disaster or extreme weather, circuit 1300 could be used to disable an electronic circuit breaker within circuit breaker panel 1308 that controls the home's air conditioning unit.

Figure 14:
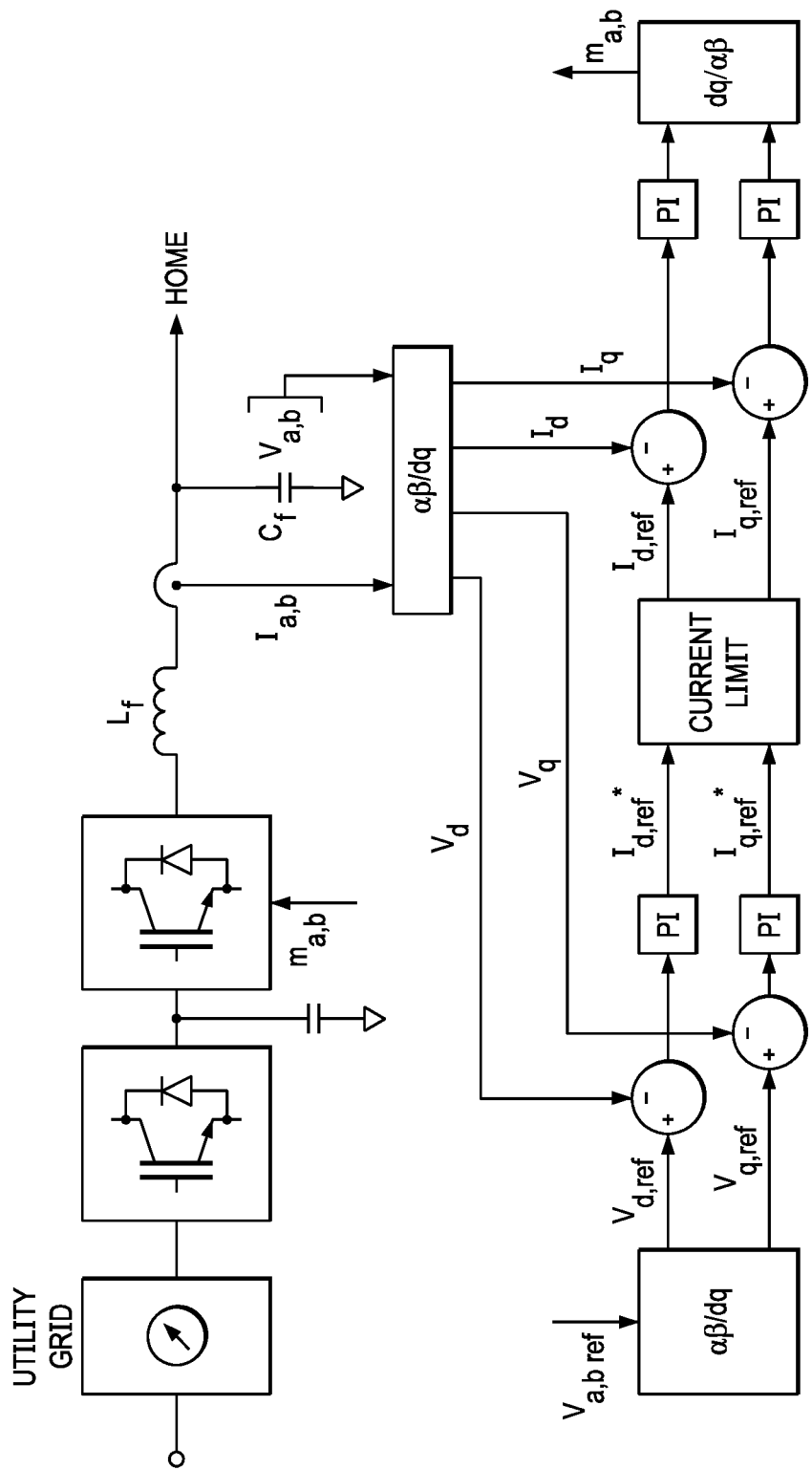
FIG. 14 illustrates current limit control for a circuit with PINE that may enable energy budgeting.

Second, energy budgeting may be accomplished by limiting the output current. This is illustrated in FIG. 14, which shows how illustrates current limit control for an example circuit with PINE may enable energy budgeting. The appreciations in FIG. 14 are noted below in TABLE 2:

| | |
|---|---|
| n | neutral point |
| a | input voltage node phase A "a" |
| b | input voltage node "b" |
| $L_{in}$ | Input reactance |

| | |
|---|---|
| $A_{in}$ | input voltage node phase A "$A_{in}$" after meter and input reactance |
| $B_{in}$ | input voltage node phase B "$B_{in}$" after meter and input reactance |
| $i_A$ | input current phase A |
| $i_B$ | input current phase B |
| ref | reference |
| $V_{DC}$ | DC voltage |
| $C_1$ | DC link capacitor 1 |
| $C_2$ | DC link capacitor 2 |
| $I_{DG}$ | Distribution generation current |
| $V_{DG}$ | Distribution generation voltage |
| $L_{DG}$ | Powe sharing converter inductance |
| $I_{BESS}$ | Battery energy storage system current |
| $V_{BESS}$ | Battery energy storage system voltage |
| $P_1$ | Positive node "P1" (before the galvanic isolation stage) |
| $N_1$ | negative node "N1" (before the galvanic isolation stage) |
| $P_2$ | Positive node "P2" (before the galvanic isolation stage) |
| $N_2$ | negative node "N2" (before the galvanic isolation stage) |
| $A_2$ | Output node phase A "$A_2$" unfiltered |
| $B_2$ | Output node phase B "$B_2$" unfiltered |
| $L_{f,A}$ | Filter inductor phase A |
| $L_{f,B}$ | Filter inductor phase B |
| $C_{f,A}$ | Filter capacitor phase A |
| $C_{f,B}$ | Filter capacitor phase B |
| $I_{a,out}$ | Output current, phase A |
| $I_{b,out}$ | Output current, phase B |
| $L_{120}$ | Inductance for second harmonic compensator |
| $C_{120}$ | Capacitance for second harmonic compensator |

The output current of FIG. 14 is controlled by the single-phase PINE converter 300. In this energy budgeting mode, the maximum amount of power delivered to a given PINE converter 300 is limited by adjusting the d component of the output current (Id) to a maximum allowable when needed, as given by:

$$I_{dref} = \begin{cases} I^*_{dref}, & I^*_{dref} \leq I_{max} \\ I_{max}, & I^*_{dref} > I_{max} \end{cases}$$

where: $I_{dref}^*$ is the reference current given by the controller under normal situation (no power limitation), and $I_{max}$ is the current limit for $I_d$ and is calculated by:

$$I_{max} = \frac{2 * P_{limit}}{|V_d|}$$

While specific components of PINE converter 300 have been described herein as performing certain functions, these functions may in some embodiments be performed by any appropriate means. For example, in some embodiments, a device includes a first means, a second means, and a third means. The first means is electrically coupled to an electrical meter and electrically coupled to an energy production array. The second means is electrically coupled to the energy production array and electrically coupled to a load. The third means is communicatively coupled to the first means, the second means, the energy production array, and the load. The first and second means are positioned between the electrical meter and the load.

As another example, a system includes a first means, a second means, and a third means. The first means is coupled to a meter and a DC-link and is configured to convert an input AC waveform from a utility feed into a DC waveform. The second means is coupled to the first means, the DC-link, and a load, and is configured to convert the DC waveform from the first means into an output AC waveform for the load. The third means is configured to: monitor a voltage and a current of the input AC waveform from the utility feed; monitor a voltage and a current of the output AC waveform for the load; provide one or more first instructions to maintain a unity power factor from the utility feed; provide one or more second instructions to draw a sinusoidal current from the utility feed; provide one or more third instructions to regulate the voltage of the output AC waveform for the load; provide one or more fourth instructions to inject power flow into the utility feed at the unity power factor; and measure an amount of energy flowing into an out of the first means. A neutral line from the utility feed is coupled to the means, the DC-link, and the second means.

Figure 15:
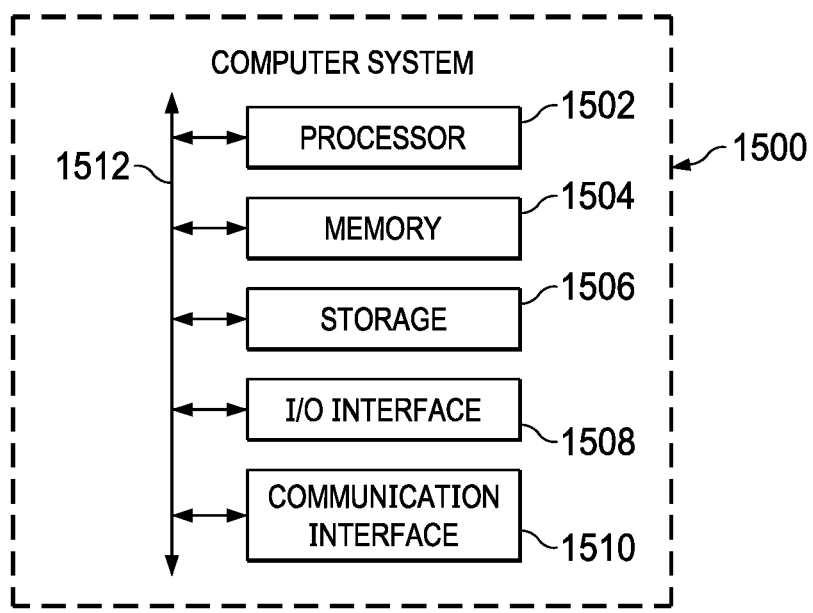
FIG. 15 illustrates a computer system that may be used by or incorporated into PINE, according to certain embodiments.

FIG. 15 illustrates an example computer system 1500 that may be utilized or incorporated into PINE. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
    a first pulse-width modulation (PWM) converter coupled to a meter and a DC-link, the first PWM converter configured to convert an input AC waveform from a utility feed into a DC waveform;
    a second PWM converter coupled to the first PWM converter, the DC-link, and a load, the second PWM converter configured to convert the DC waveform from the first PWM converter into an output AC waveform for the load; and
    a control module configured to:
        monitor a voltage and a current of the input AC waveform from the utility feed;
        monitor a voltage and a current of the output AC waveform for the load;
        provide one or more first instructions to maintain a unity power factor from the utility feed;
        provide one or more second instructions to draw a sinusoidal current from the utility feed;
        provide one or more third instructions to regulate the voltage of the output AC waveform for the load;
        provide one or more fourth instructions to inject power flow into the utility feed at the unity power factor; and
        measure an amount of energy flowing into an out of the first PWM converter;
    wherein a neutral line from the utility feed is coupled to the first PWM converter, the DC-link, and the second PWM converter.

2. The system of claim 1, wherein the DC-link comprises:
    an interface configured to be coupled to a battery and a photovoltaic (PV) array;
    a power sharing converter; and
    a DC-DC boost converter.

3. The system of claim 1, further comprising an output filter coupled between the second PWM converter and a circuit breaker panel, wherein the control module is configured to enact an energy budget by controlling one or more circuit breakers within the circuit breaker panel.

4. The system of claim 1, wherein the control module is configured to enact an energy budget by limiting an output current delivered to the load.

5. The system of claim 1, further comprising a plurality of switches comprising:
- a first switch coupled between the meter and the load;
- a second switch coupled between the first PWM converter and the meter; and
- a third switch coupled between the second PWM converter and the load.

6. The system of claim 5, wherein the control module is configured to:
- control one or more of the plurality of switches in order to electrically couple the meter to the load, thereby bypassing the system;
- control one or more of the plurality of switches in order to bypass the first PWM converter; and
- control one or more of the plurality of switches in order to bypass the second PWM converter.

* * * * *